United States Patent

Huang

[11] Patent Number: 6,036,452
[45] Date of Patent: Mar. 14, 2000

[54] DEVICE FOR COUPLING A SHORT-AXLE TYPE MOTOR WITH A PUMP

[76] Inventor: Tsung-Jen Huang, No. 5, Alley 8, Lane 402, Sungchiang Rd., Taipei, Taiwan

[21] Appl. No.: 09/074,440

[22] Filed: May 7, 1998

[51] Int. Cl.[7] .............................. F04B 17/00; F16D 1/02
[52] U.S. Cl. .......................... 417/360; 403/337; 403/335; 403/16; 403/300
[58] Field of Search .................. 417/360, 423.6, 417/423.14; 403/3, 4, 335, 336, 337, 347, 16, 9, 300, 301, 302, 305

[56] References Cited

U.S. PATENT DOCUMENTS

| | | | |
|---|---|---|---|
| 281,618 | 7/1883 | Cromwell | 403/337 |
| 1,163,967 | 12/1915 | Arntzen et al. | 403/337 |
| 2,278,997 | 4/1942 | Knight | 403/337 |
| 2,585,113 | 2/1952 | Gredell | 403/337 |
| 2,653,834 | 9/1953 | Purkhiser | 403/337 |
| 2,720,765 | 10/1955 | Drexler | 403/306 |
| 3,039,797 | 6/1962 | Harper | 403/337 |
| 3,418,009 | 12/1968 | Pollia | 403/337 |
| 3,920,340 | 11/1975 | Jones et al. | 403/306 |
| 4,055,967 | 11/1977 | Terranova et al. | 464/10 |
| 4,086,012 | 4/1978 | Buckley et al. | 114/279 |
| 4,121,532 | 10/1978 | Coryell, III | 440/83 |
| 4,204,589 | 5/1980 | Loker et al. | 192/27 |
| 4,348,190 | 9/1982 | Barrett | 434/278 |
| 4,545,395 | 10/1985 | Kolb | 134/115 R |
| 4,781,211 | 11/1988 | Cormier | 137/383 |
| 4,845,448 | 7/1989 | Olsson | 333/254 |
| 4,850,109 | 7/1989 | Kerwin | 30/122 |
| 4,986,690 | 1/1991 | Cooksey | 403/319 |
| 5,163,335 | 11/1992 | Isom et al. | 74/6 |
| 5,176,575 | 1/1993 | McCullough | 464/99 |
| 5,179,607 | 1/1993 | Sellers et al. | 385/70 |
| 5,195,880 | 3/1993 | Gruber | 418/5 |
| 5,269,622 | 12/1993 | Mullenberg | 403/370 |
| 5,306,093 | 4/1994 | Elbert | 403/259 |
| 5,330,284 | 7/1994 | Persson | 403/370 |
| 5,348,387 | 9/1994 | Gordon et al. | 366/63 |
| 5,427,181 | 6/1995 | Laskaris et al. | 169/14 |
| 5,441,358 | 8/1995 | King | 403/30 |
| 5,501,542 | 3/1996 | Hall, Sr. | 403/306 |

*Primary Examiner*—Charles G. Freay
*Assistant Examiner*—Robert Z. Evora
*Attorney, Agent, or Firm*—Hedman, Gibson & Costigan, P.C.

[57] ABSTRACT

A device is provided for coupling a short-axle type motor with a pump, wherein the motor has a first side and a second side, and a short axle rotatably extending through the first side of the motor. The coupling device includes a large disk having a first side fixedly mounted on the first side of the motor and a second side, and defining a first center hole for passage of the short axle, a small disk having a first side fixedly mounted on the second side of the large disk and a second side, and defining a second center hole communicating with the first center hole, and a coupling having a first side connected with the short axle of the motor and a second side connected with a spindle of a pump. In such a manner, the large disk co-operating with the small disk can be adapted to couple a motor with a pump of different sizes.

10 Claims, 4 Drawing Sheets

DEVICE FOR COUPLING A SHORT-AXLE TYPE MOTOR WITH A PUMP

FIELD OF THE INVENTION

The present invention relates to a coupling device, and more particularly to a device for coupling a short-axle type motor with pump different sizes.

BACKGROUND OF THE INVENTION

A conventional device for coupling a motor with a pump comprises a bracket secured to the motor, and a space defined in the bracket for receiving the pump. By such an arrangement, the coupling device can be used to couple the motor with the pump of one size only such that another pump of a different size cannot be coupled with the motor by means of the coupling device, thereby greatly limiting the versatility thereof.

The present invention has arisen to mitigate and/or obviate the disadvantage of the conventional coupling device.

SUMMARY OF THE INVENTION

In accordance with one aspect of the present invention, there is provided a device for coupling a short-axle type motor with a pump, wherein the motor includes a first side and a second side, and a short axle rotatably extending through the first side of the motor.

The coupling device comprises a large disk including a first side adapted to be fixedly mounted on the first side of the motor and a second side, and defining a first center hole adapted for passage of the short axle, a small disk including a first side fixedly mounted on the second side of the large disk and a second side, and defining a second center hole communicating with the first center hole of the large disk, and a coupling including a first side connected with the short axle of the motor and a second side.

By such an arrangement, the large disk co-operating with the small disk can be adapted to be fixedly connected with pumps of different sizes.

Further features of the present invention will become apparent after a careful reading of the detailed description with appropriate reference to the accompanying drawings.

DETAILED DESCRIPTION OF THE PREFERRED EMBODIMENTS

Figure 1:
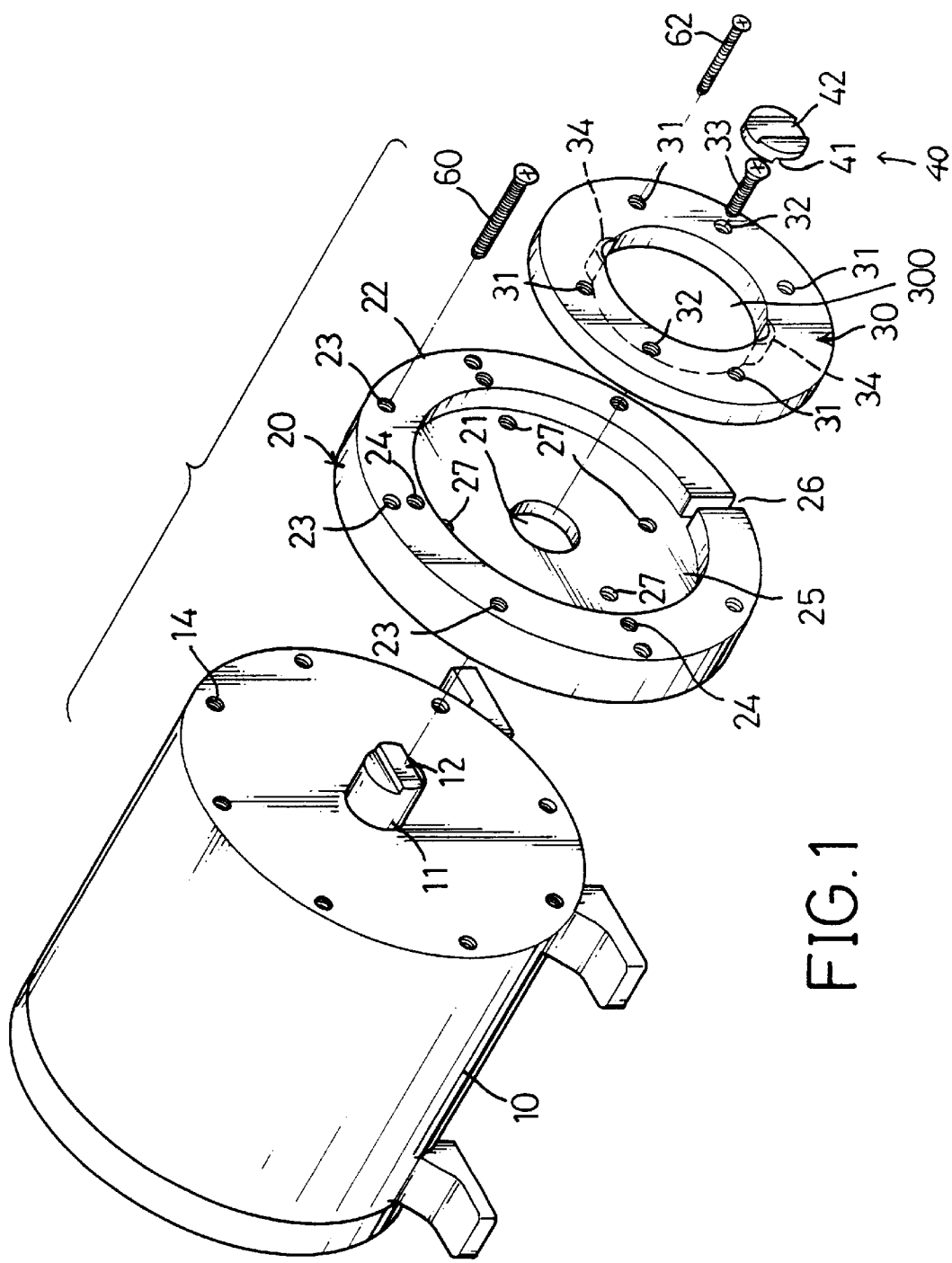
FIG. 1 is an exploded view of a coupling device for coupling a short-axle type motor with a pump in accordance with the present invention.
Figure 2:
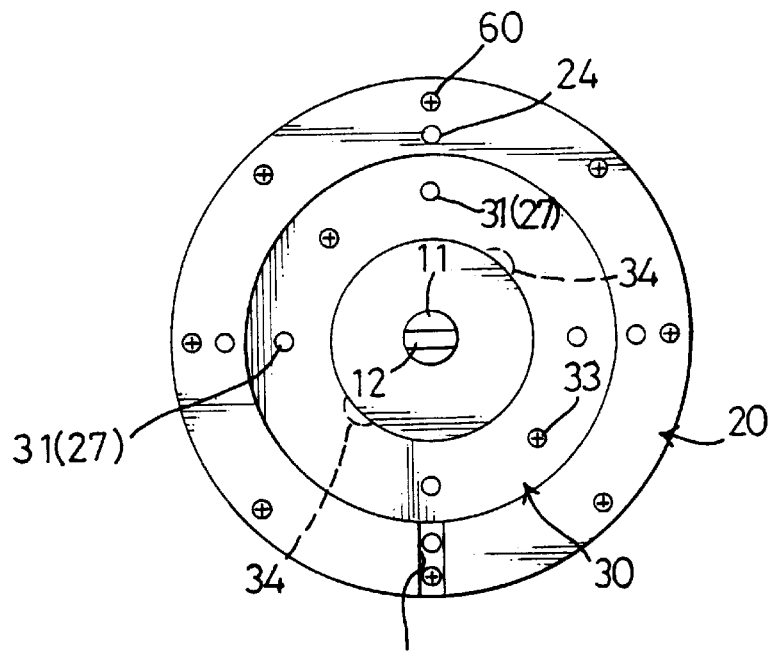
FIG. 2 is a side plan assembly view of the coupling device as shown in FIG. 1.
Figure 3:
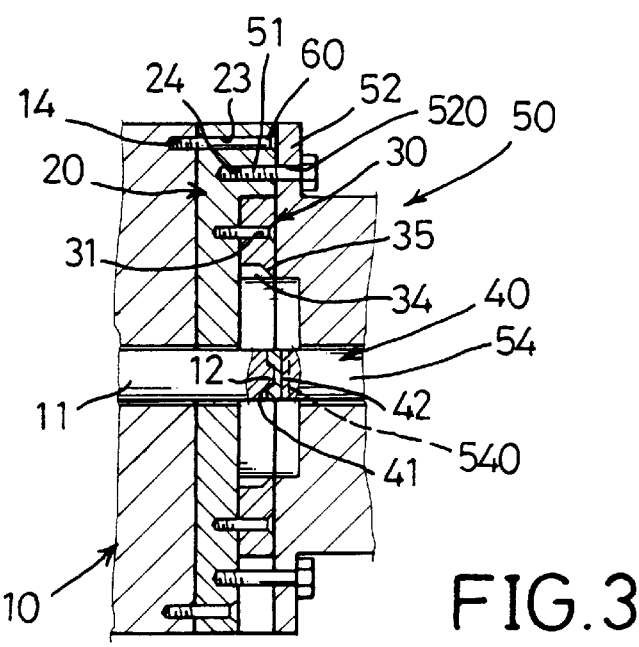
FIG. 3 is a front plan partially cross-sectional assembly view of the coupling device as shown in FIG. 1.

Referring to the drawings and initially to FIGS. 1–3, a coupling device in accordance with the present invention can be adapted for coupling a short-axle type motor 10 with pumps of different sizes. The motor 10 includes a first side and a second side, and a short axle 11 rotatably extending through the first side of the motor 10. A pump 50 of a large size includes a first side and a second side, and a spindle 54 rotatably extending through the first side of the pump 50.

The coupling device comprises a large disk 20 including a first side fixedly mounted on the first side of the motor 10 and a second side, and defining a first center hole 21 for passage of the short axle 11, a small disk 30 including a first side fixedly mounted on the second side of the large disk 20 and a second side, and defining a second center hole 300 communicating with the first center hole 21 of the large disk 20, and a coupling 40 (see also in FIG. 6) including a first side connected with the short axle 11 of the motor 10 and a second side connected with the spindle 54 of the pump 50.

The short axle 11 of the motor 10 is formed with a key 12 extending outwardly, and the first side of the coupling 40 defines a spline 41 for receiving the key 12 therein. The spindle 54 of the pump 50 is formed with a key 540 extending outwardly, and the second side of the coupling 40 defines a spline 42 for receiving the key 540 therein, whereby the spindle 54 of the pump 50 can be rotated with the axle 11 of the motor 10.

The second side of the large disk 20 defines a circular recess 25 for receiving the small disk 30 and is formed with an annular flange 22 enclosing the circular recess 25. The annular flange 22 radially defines an oil draining opening 26 to communicating with the circular recess 25.

The first side of the motor 10 defines a plurality of first threaded holes 14 in an outer periphery thereof, the annular flange 22 defines a plurality of second threaded holes 23 each aligning with a corresponding one of the first threaded holes 14, and a plurality of positioning members 60 each extend through a corresponding one of the second threaded holes 23 and each extend through an associated first threaded hole 14, thereby securing the large disk 20 to the motor 10.

The pump 50 includes an outer periphery formed with an annular seat 52 defining a plurality of first threaded bores 520, the annular flange 22 defines a plurality of second threaded bores 24 each aligning with a corresponding one of the first threaded bores 520, and a plurality of positioning members 51 each extend through a corresponding one of the first threaded bores 520 and through an associated second threaded bore 24, thereby securing the pump 50 of a large size to the large disk 20.

Figure 4:
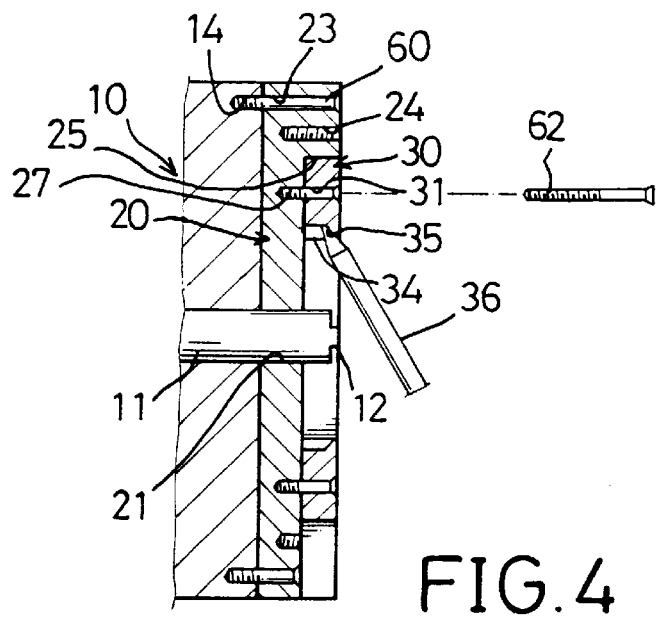
FIG. 4 is an operational view of FIG. 3.

Referring now to FIG. 4 with reference to FIGS. 1, wherein the pump 50 of a large size is removed, and a second pump (not shown) of a small size is intended to be mounted to the large disk 20.

The second side of the large disk 20 defines a plurality of first threaded sockets 27, the small disk 30 defines a plurality of second threaded sockets 31 each aligning with a corresponding one of the first threaded sockets 27, the second pump includes an outer periphery formed with an annular seat (not shown) defining a plurality of third threaded sockets (not shown) each aligning with a corresponding one of the second threaded sockets 31, and a plurality of positioning members 62 each extend through a corresponding one of the third threaded sockets, an associated second threaded socket 31 and an associated first threaded socket 27, thereby securing the small disk 30 together with the second pump of a small size to the large disk 20.

By such an arrangement, the large disk 20 co-operating with the small disk 30 can be adapted to couple the motor 10 with the pump 50 of a large size or the to second pump of a small size.

Again referring to FIG. 4 with reference to FIG. 1, in accordance with a first embodiment of the present invention, the small disk 30 defines a plurality of cavities 34 each communicating with the circular recess 25 of the large disk 20 and each formed with an inclined surface 35, and a tool 36 includes one distal end which can be inserted into one of the cavities 34 via the inclined surface 35 for removing the small disk 30 from the large disk 20 when the positioning members 62 are unscrewed and the second pump is removed from the small disk 30.

Figure 5:
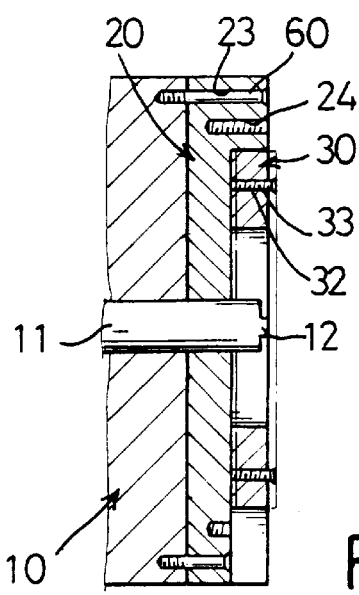
FIG. 5 is another operational view of FIG. 3.

Referring now to FIG. 5 with reference to FIG. 1, in accordance with a second embodiment of the present invention, the small disk 30 defines a plurality of reverse threads 32, and a plurality of release screws 33 each include a shank extending through a corresponding one of the reverse threads 32 and abutting on the second side of the large disk 20. By such an arrangement, the small disk 30 can be displaced from a first position as shown in solid lines to a second position as shown in phantom lines by means of successively rotating each of the release screws 33 in the respective reverse thread 32 such that the small disk 30 can be removed from the large disk 20 by exerting an external force when the positioning members 62 are unscrewed and the second pump is removed from the small disk 30.

Figure 6:
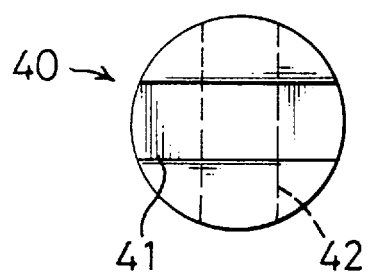
FIGS. 6–9 are front plan views of a coupling in accordance with the present invention.
Figure 7:
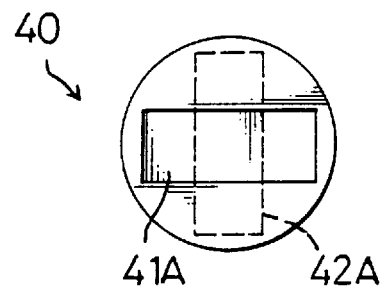
Figure 8:
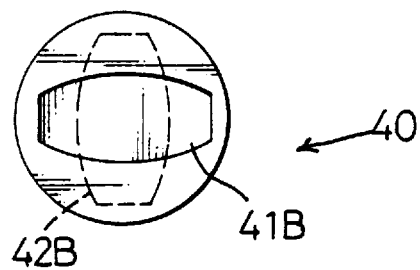
Figure 9:
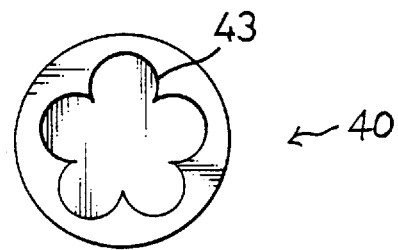

Referring now to FIGS. 6–9, the coupling 40 can be adapted to define two splines 41 and 42 as shown in FIG. 6, two rectangular slots 41A and 42A as shown in FIG. 7, two substantially oblong recesses 41B and 42B as shown in FIG. 8, or two multi-lobic sockets 43 as shown in FIG. 9.

It should be clear to those skilled in the art that further embodiments may be made without departing from the scope and spirit of the present invention.

What is claimed is:

1. A device for coupling a short-axle type motor (10) with a pump, said motor (10) including a first side and a second side, and a short axle (11) rotatably extending through said first side of said motor (10), and said coupling device comprising:

a large disk (20) including a first side adapted to be fixedly mounted on said first side of said motor (10) and a second side, and defining a first center hole (21) adapted for passage of said short axle (11);

a small disk (30) including a first side fixedly mounted on said second side of said large disk (20) and a second side, and defining a second center hole (300) communicating with said first center hole (21) of said large disk (20); and a coupling (40) including a first side connected with said short axle (11) of said motor (10) and a second side;

wherein, said large disk (20) co-operating with said small disk (30) is adapted to be fixedly connected with pumps of different sizes.

2. The coupling device in accordance with claim 1, wherein said second side of said large disk (20) defines a circular recess (25) for receiving said small disk (30) and is formed with an annular flange (22) enclosing said circular recess (25).

3. The coupling device in accordance with claim 2, wherein said first side of said motor (10) defines a plurality of first threaded holes (14) in an outer periphery thereof, said annular flange (22) defines a plurality of second threaded holes (23) each adapted to align with a corresponding one of said first threaded holes (14), and a plurality of positioning members (60) each extend through a corresponding one of said second threaded holes (23) and are each adapted to extend through an associated said first threaded hole (14), thereby securing said large disk (20) to said motor (10).

4. The coupling device in accordance with claim 2, wherein a pump (50) includes an outer periphery formed with an annular seat (52) defining a plurality of first threaded bores (520), said annular flange (22) defines a plurality of second threaded bores (24) each adapted to align with a corresponding one of said first threaded bores (520), and a plurality of positioning members (51) are each adapted to extend through a corresponding one of said first threaded bores (520) and through an associated said second threaded bore (24), thereby securing said pump (50) to said large disk (20).

5. The coupling device in accordance with claim 4, wherein said pump (50) includes a spindle (54) rotatably mounted therein, and a key (540) extending from said spindle (54), and said second side of said coupling (40) defines a spline (42) adapted for receiving said key (540) therein.

6. The coupling device in accordance with claim 2, wherein said second side of said large disk (20) defines a plurality of first threaded sockets (27), said small disk (30) defines a plurality of second threaded sockets (31) each aligning with a corresponding one of said first threaded sockets (27), and a plurality of positioning members (62) each extend through a corresponding one of said second threaded sockets (31) and an associated said first threaded socket (27), thereby securing said small disk (30) to said large disk (20).

7. The coupling device in accordance with claim 2, wherein said annular flange (22) radially defines an oil draining opening (26) communicating with said circular recess (25).

8. The coupling device in accordance with claim 2, wherein said small disk (30) defines a plurality of reverse threads (32), and a plurality of release screws (33) each include a shank extending through a corresponding one of said reverse threads (32) and abutting on said second side of said large disk (20).

9. The coupling device in accordance with claim 2, wherein said small disk (30) defines a plurality of cavities (34) each communicating with said circular recess (25) of said large disk (20) and each formed with an inclined surface (35), and a tool (36) includes one distal end which can be inserted into one of said cavities (34) via said inclined surface (35) for removing said small disk (30) from said large disk (20).

10. The coupling device in accordance with claim 1, wherein said short axle (11) of said motor (10) is formed with a key (12), and said first side of said coupling (40) defines a spline (41) adapted for receiving said key (12) therein.

* * * * *